May 12, 1942. C. J. SMITH 2,282,679
APPARATUS FOR REMOVING GRASS, WEEDS, AND OTHER MATTER FROM THE GROUND
Filed Nov. 19, 1940 5 Sheets-Sheet 1
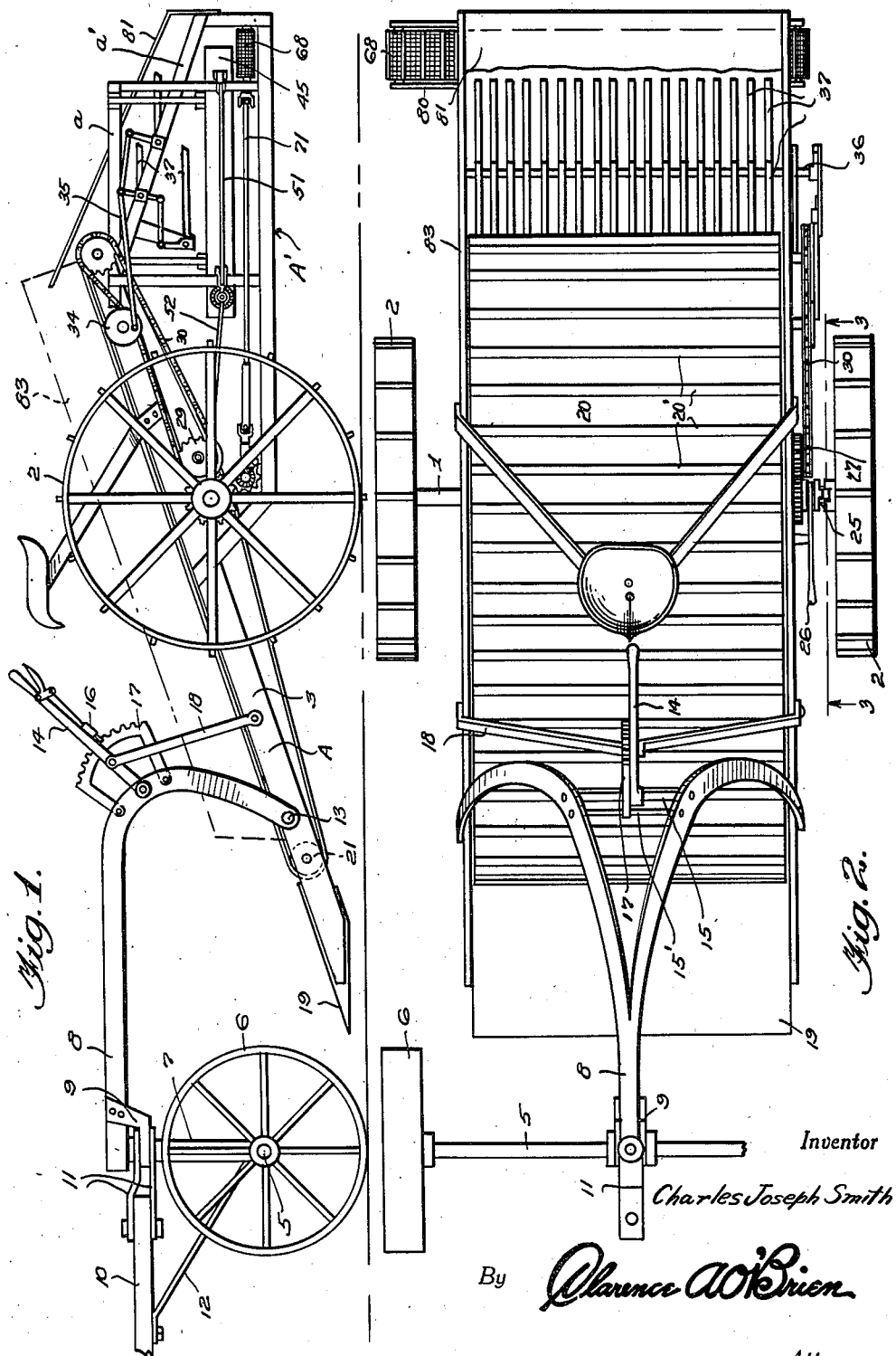

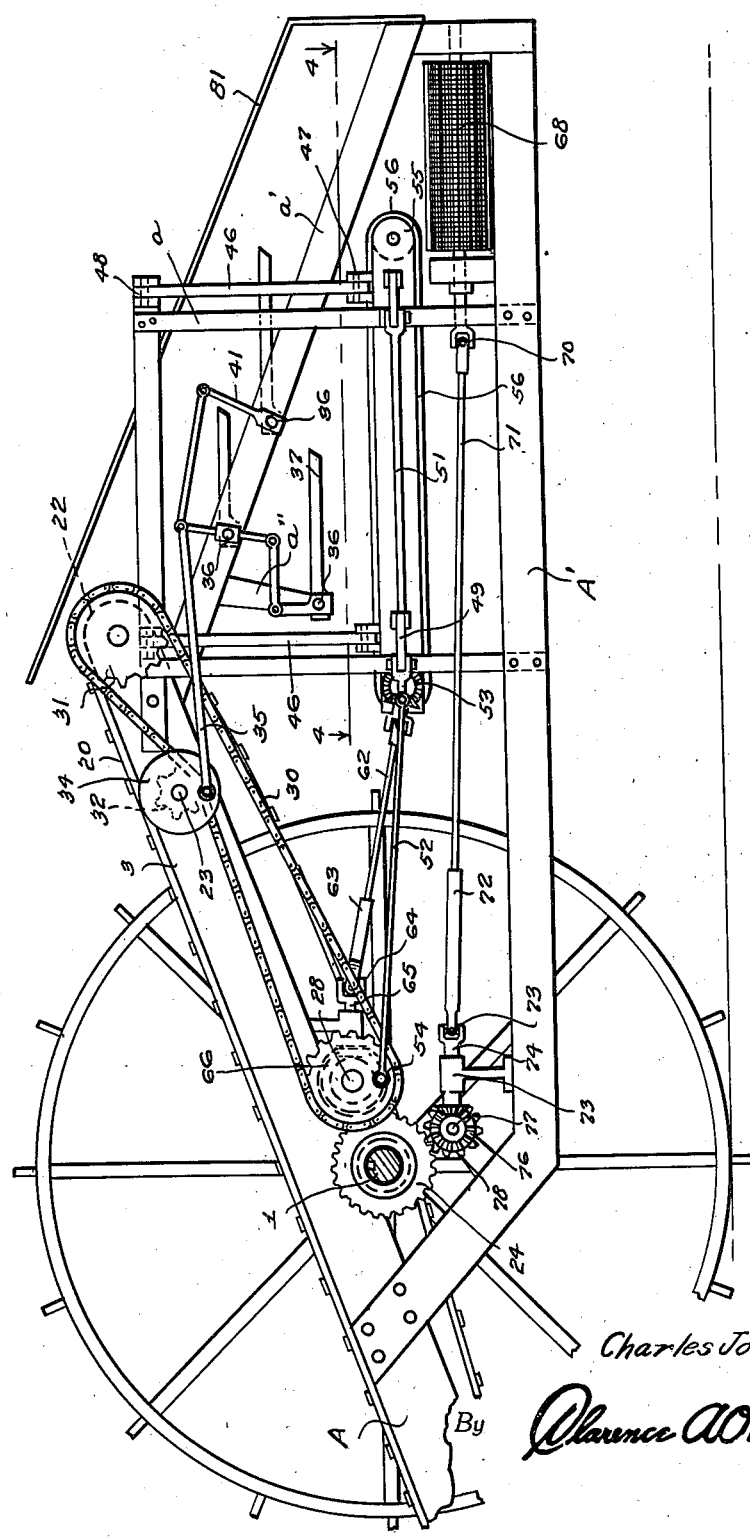

May 12, 1942. C. J. SMITH 2,282,679
APPARATUS FOR REMOVING GRASS, WEEDS, AND OTHER MATTER FROM THE GROUND
Filed Nov. 19, 1940 5 Sheets-Sheet 3

Inventor
Charles Joseph Smith
By Clarence A. O'Brien
Attorney

Inventor
Charles Joseph Smith

By Clarence A. O'Brien

Attorney

May 12, 1942.　　　　C. J. SMITH　　　　2,282,679
APPARATUS FOR REMOVING GRASS, WEEDS, AND OTHER MATTER FROM THE GROUND
Filed Nov. 19, 1940　　　5 Sheets-Sheet 5

Inventor
Charles Joseph Smith
By Clarence A. O'Brien
Attorney

Patented May 12, 1942

2,282,679

UNITED STATES PATENT OFFICE 2,282,679

APPARATUS FOR REMOVING GRASS, WEEDS, AND OTHER MATTER FROM THE GROUND

Charles Joseph Smith, Albany, N. Y.

Application November 19, 1940, Serial No. 366,312

2 Claims. (Cl. 97—10)

This invention relates to an apparatus for removing weeds, grass and other matter from the soil or ground, the general object of the invention being to provide a wheel supported frame having plow means for lifting the soil upon a conveyor which conveys the soil with the matter therein upon shaker means which breaks up the lumps and separates the soil from the roots and other matter and deposits it upon a shaker screen which permits the soil to pass through and fall back upon the ground and which delivers the plants and the roots upon a conveyor which conveys the material to a point at one side of the machine, all the parts being operated from one of the ground wheels.

Another object of the invention is to provide means for adjusting the plow means toward and away from the ground.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view of the complete machine.

Figure 2 is a plan view thereof.

Figure 3 is a section on the line 3—3 of Figure 2.

Figure 7:
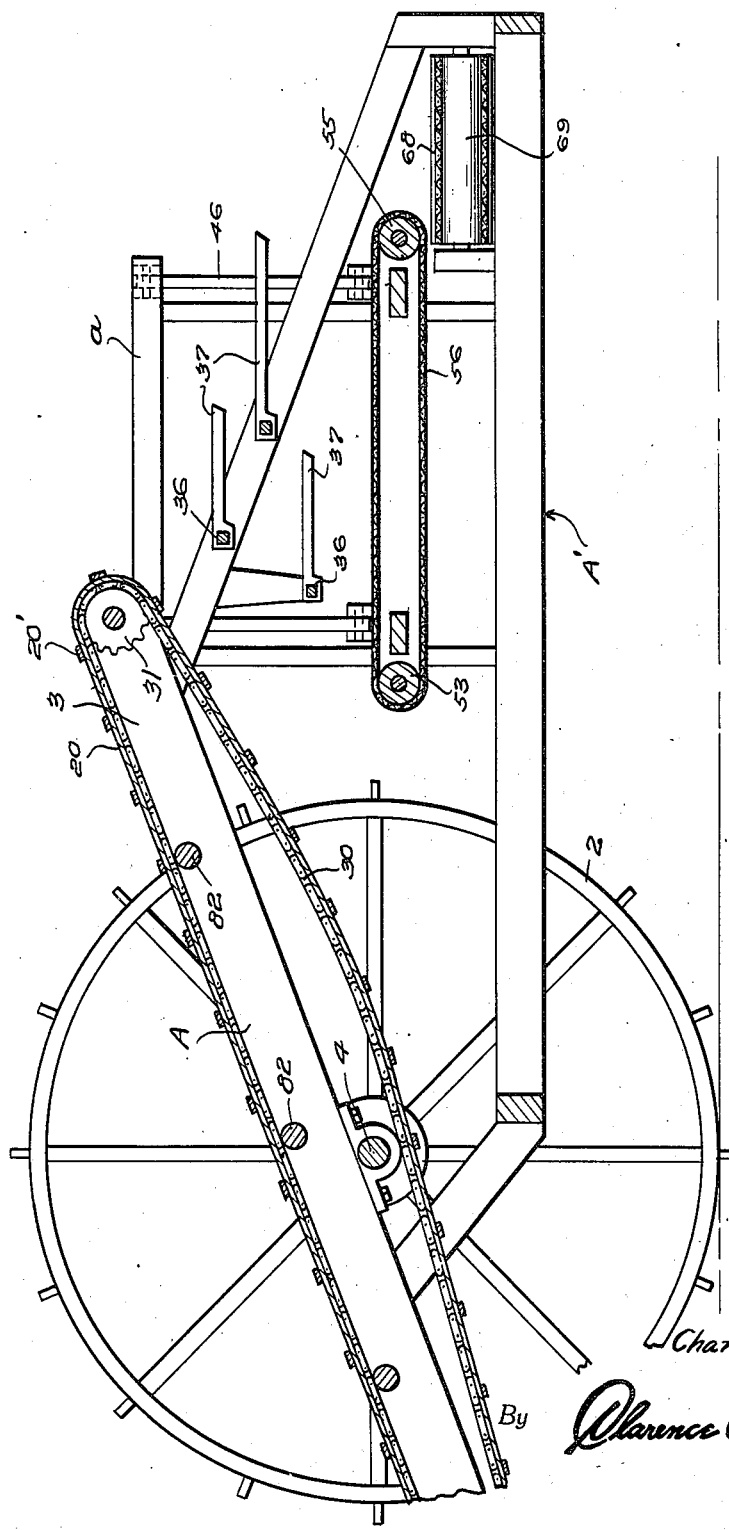
Figure 7 is a vertical sectional view taken longitudinally through the rear part of the apparatus.

In these views the numeral 1 indicates a rear axle which has the ground engaging wheels 2 at its ends and the letter A indicates an elongated longitudinally extending frame which includes the side bars 3 which are supported for rocking movement on the axle 1 by the bearing means 4 shown in Figure 7. A front axle 5 carries the front wheels 6 at its end and an upright member 7 having its lower end supported from the front axle and the upper end of this member is swivelled to the front end of a beam 8 which has a bracket 9 connected therewith which forms part of the swivelling means. A tongue 10 is connected by the plates 11 to the swivelling means and a brace 12 connects the tongue with the lower end of the member 7, this tongue serving as means for connecting a tractor or a team with the apparatus. The beam 8 is of Y-shape as shown in Figure 2 with its rear end curving downwardly and pivoted to the front portion of the frame A as shown at 13. A hand lever 14 is pivoted to a brace rod 15 extending between the diverging limbs of the Y-shaped beam and has the usual latch means 16 for engaging the quadrant or segment 17 connected with the brace 15 and a second brace 15'. A link assembly 18 connects the lever 14 with the side members 3 of the frame A in rear of the pivot 13 so that by adjusting the lever the frame can be rocked on the rear axle to adjust the front end of the frame relative to the ground.

This front end of the frame carries a blade or plow 19 which is substantially the length of the width of the frame and when the apparatus is in operative position this blade penetrates the ground and lifts the soil in a strip which passes upwardly and rearwardly over the blade and then this strip of soil passes upon the conveyor belt 20 which passes over the front roller 21 and the rear roller 22 rotatably supported by the side members 3 of the frame A. The belt has attached thereto the cross strips 20' for causing the soil and the matter therein to move along with the belt.

Figure 6:
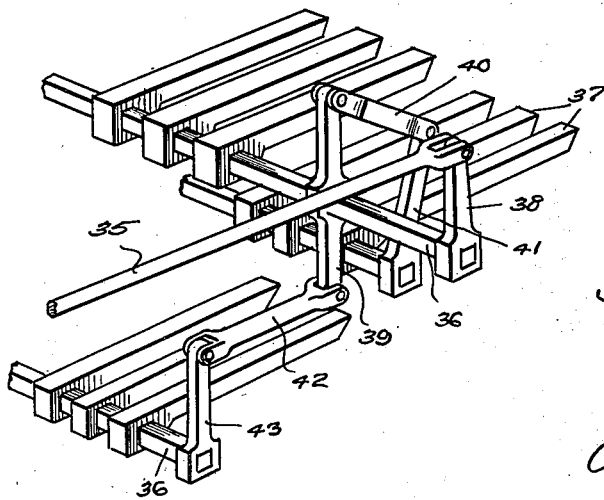
Figure 6 is a perspective view of portions of the shaker finger assembly.

A gear 24 is rotatably arranged on the rear axle and is adapted to be connected by clutch means shown generally at 25 to one of the rear wheels, the clutch lever being shown at 26. Of course, when the clutch means are in active position the gear will be rotated from the ground wheel. The gear 24 meshes with a gear 27 on a stub shaft 28 rotatably supported from the frame and this stub shaft carries a sprocket 29 over which a chain 30 passes, the chain also passing over a sprocket 31 connected with the pintle of the rear roller 22 so that when the clutch means are in active position the conveyor belt 20 will be actuated from the ground wheel. The chain also passes under a sprocket 32 on a shaft 33 supported for rotary movement by the rear part of the frame A and said shaft carries a crank disk 34, the crank pin of which has a pitman 35 connected therewith so that the pitman is actuated by the chain 30. A rear frame A' is supported from the rear part of the frame A and an upright frame a is carried by an intermediate part of the frame A', said frame A' including rearwardly and downwardly sloping parts a' and having their upper ends connected with the rear ends of the side members 3 of the frame A. These frame parts a' and the depending parts a" of the parts a' carry the transversely arranged rock shafts 36, the drawings showing three of these shafts and each shaft carries a plurality of fingers 37, see Figure 6, which are spaced apart and substantially horizontally arranged and extending rearwardly from the shafts. One shaft 36 is arranged to have its fingers arranged in front of and above the plane of the fingers of the second shaft and the fingers of the third shaft are located under the fingers of the first shaft and extend forwardly beyond the vertical plane of said third shaft as clearly shown in Figure 3. The uppermost shaft has an upstanding arm 38 thereon to which the rear end of the pitman 35 is connected and a double arm 39 is connected with this upper shaft 36 and a link 40 connects the upper end of this double arm with an arm 41 on the rearmost shaft 36 and a link 42 connects the lower end of the double arm 39 with an arm 43 on the lowermost shaft 36, as clearly shown in Figure 6. Thus as the crank disk 34 rotates the pitman will rock all three shafts which causes a vertical rocking motion to the fingers 37 so that the material dropping upon these fingers will be shaken and lumps broken up and roots of plants separated from the soil.

As will be seen from Figures 3 and 7 the material dropping off the rear end of the conveyor belt will drop upon the fingers of the upper shaft 36 and some upon the fingers of the lower shafts and material passing rearwardly from the upper fingers will be engaged by the fingers of the rear shaft so that the three sets of fingers will thoroughly shake the material dropping upon them so that the lumps will be broken and the roots separated from the soil.

Figure 4:
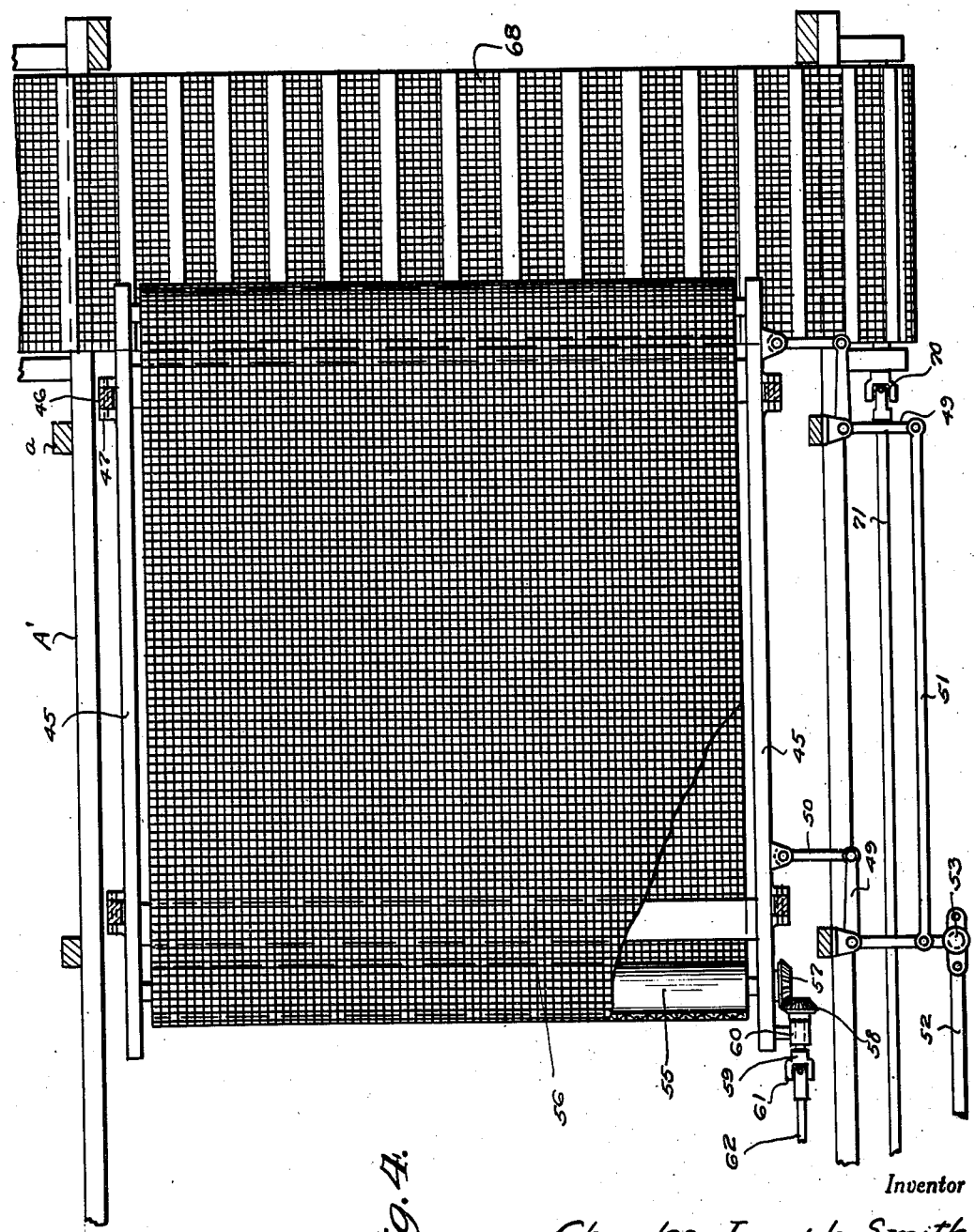
Figure 4 is a section on the line 4—4 of Figure 3.
Figure 5:
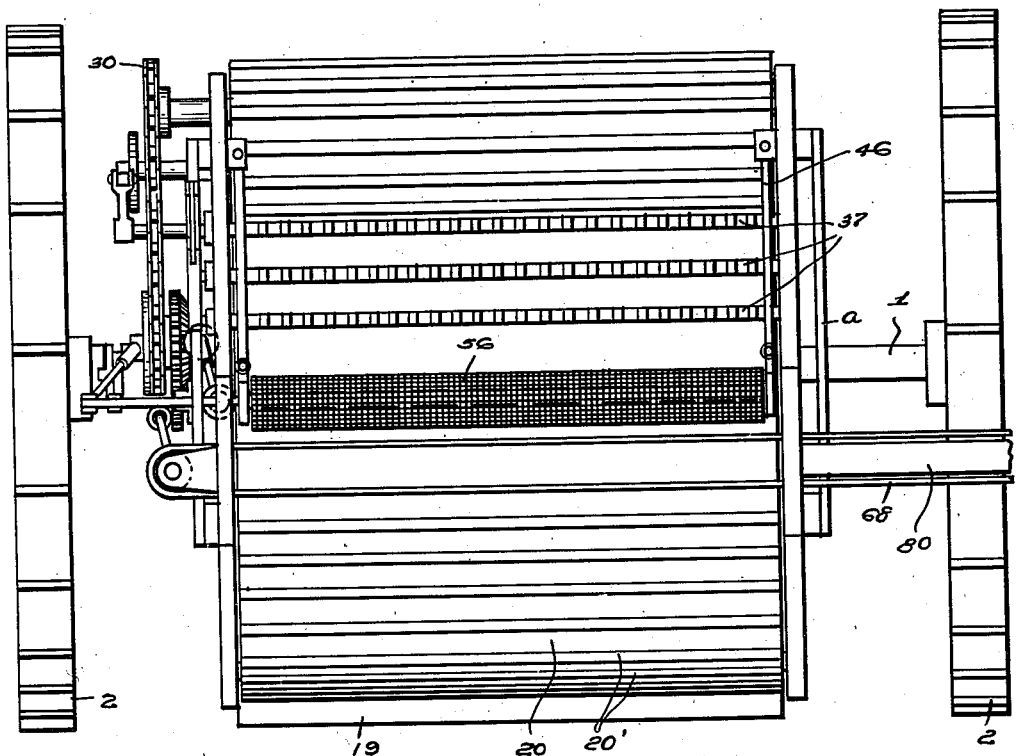
Figure 5 is a rear view of the apparatus.

A horizontally arranged shaker frame 45 is arranged betwen the side parts of the upright frame a and is supported from the top of this frame a by the depending links 46 which have the lower ends pivotally connected with the frame 45 as shown at 47 and their upper ends are pivotally connected with the top part of the frame a as shown at 48. This frame is given a laterally shaking motion by means of the front and rear bellcranks 49, see Figure 4, which are connected with one side of the frame 45 by the links 50 and the two bellcranks are connected together by the links 51. A rod 52 is connected to the front bellcrank by a universal joint 53. The rod 52 is connected to the crank pin 54 on the sprocket 29 so that the rotary movement of this sprocket causes a lateral rocking or shaking movement of the frame 45.

This frame 45 carries the front and rear rollers 55 over which passes a perforated belt 56, this belt receiving the material dropping from the shaker fingers 37, the pintle of the front roller 55 carries a bevel gear 57 which meshes with a similar gear 58 on a stub shaft 59 passing through the bearing means 60 on the front part of the frame 45 and a universal joint 61 connects this stub shaft with a shaft 62 which telescopes into a collar shaft 63 connected by universal joints 64 with a stub shaft 65 rotatably supported from the frame A with bevel gears 66 driving the shaft 65 from the shaft 28. Thus the belt is actuated from the shaft 28, the universal and telescopic shafting which connects the front roller 55 of the belt 56 with the drive means permitting the rocking movement of the frame 45 which carries the belt 56 and its supporting rollers and the shaft 52 and its associated parts for rocking the frame 45 is also constructed to permit the drive to be communicated by rocking the shaft 45 without interfering with the rocking movement.

A transversely arranged slatted and perforated belt 68 is supported by the rolls 69 at the rear of the frame A' and a universal joint 70 connects the pintle of one of these rolls with a shaft 71 which telescopes into a tubular shaft 72 connected by a universal joint 73 with a stub shaft 74 supported by a bearing member 75 on the frame A' and this stub shaft 74 is connected by the beveled gears 76 to a shaft 77 which has a gear 78 thereon meshing with the gear 24 on the shaft 1 so that the conveyor 68 is driven when the clutch means connects the ground wheel with the gear 1. The other roll 69 of this rear conveyor is supported by the members 80 which extend laterally from the rear end of the supporting frame A' so that it will deposit the material to one side of the machine. As the machine travels along the plow or blade cuts into the ground to a depth of several inches, according to the setting of the lever 14. The dirt lifted by the plow or blade is moved upwardly and rearwardly by the conveyor 20 and drops upon the fingers 37. These fingers move up and down so that the soil is broken up and shaken off the roots. Some of the roots with the soil will pass between the fingers and drop upon the perforated belt 56 and the soil will pass through the belt and drop back upon the ground. All matter not dropping through the spaces between the fingers 37 will drop off the rear ends of the rearmost fingers upon the lateral conveyor 68 and the material not passing through the perforated screen 56 will also be deposited upon this conveyor 68 which conveys the material to one side of the machine where it will be dried and killed by the sun or it may be raked up and burned. The vibrating frame 45 will shake the perforated belt 56 so that the material thereon is shaken which causes the fine dirt and soil to pass through the perforations in the belt and to be separated from the other matter which is carried by the perforated belt upon the conveyor 68.

Thus this machine will save much time and labor in combatting weeds, grass, etc. It can also be used in cleaning up stubble in corn fields, thus aiding in the fight against the corn borer.

A cover 81 may be supported at the rear of the apparatus to cover the rear end of the conveyor 20 and the fingers, the belt 56 and the belt 68 so as to prevent stones, clods of earth and the like from being thrown from the machine.

Transversely extending rolls 82 extend across the space between the side frame 83 for supporting the upper reach of the conveyor 20 and upstanding side boards 83 may be provided for the conveyor to prevent dirt and other matter from falling off the side edges of the conveyor.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An apparatus of the class described comprising a wheel supported frame including an elongated longitudinally arranged conveyor carrying part sloping downwardly and forwardly, a blade at the lower end of said part for penetrating the soil and lifting the soil, conveyor means carried by said part for conveying the soil from the blade upwardly and rearwardly, means for raising and lowering the conveyor carrying part for lifting the blade from the ground and for regulating the depth of penetration of the blade in the ground, a plurality of sets of shaker fingers at the rear of the frame for receiving the material dropping from the rear end of the conveyor, means for rocking said fingers, a perforated belt below the fingers for receiving material therefrom, means for swinging the belt supporting means laterally, a laterally extending conveyor having a part extending beyond one side edge of the apparatus and said lateral conveying means receiving material from the perforated belt and some of the fingers and means actuating the moving parts.

2. An apparatus of the class described comprising a portable supporting frame, digging means carried by a front portion of the supporting frame, conveying means for receiving the material from the digging means, a plurality of cross shafts supported for rocking movement in the supporting frame, a plurality of rearwardly extending fingers carried by each shaft, said fingers receiving the material from the rear end of the conveyor means, means for rocking the finger carrying shafts for swinging the fingers upwardly and downwardly, said shafts being in different horizontal and vertical planes, a horizontal frame supported for lateral swinging movement in the supporting frame and under the fingers, an endless perforated belt, rollers supporting the same and carried by the horizontal frame for receiving material passing through the fingers, a laterally extending conveyor at the rear of the rear frame and having an end extending beyond a side of the frame, said last mentioned conveyor receiving material from some of the fingers and from the perforated belt and means for actuating the moving parts from one of the ground wheels.

CHARLES JOSEPH SMITH.